United States Patent
Behr et al.

(10) Patent No.: US 8,080,951 B2
(45) Date of Patent: Dec. 20, 2011

(54) DRIVE APPARATUS AND METHOD FOR ITS OPERATION

(75) Inventors: Wolfram Behr, München (DE); Jens Hamann, Fürth (DE); Markus Knorr, Augsburg (DE); Jürgen Krejtschi, Nürnberg (DE); Elmar Schäfers, Fürth (DE); Dietmar Stoiber, Fürth (DE); Wolfgang Wolter, Herbertshausen (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 12/363,164

(22) Filed: Apr. 23, 2009

(65) Prior Publication Data
US 2009/0200968 A1    Aug. 13, 2009

(30) Foreign Application Priority Data

Feb. 1, 2008 (EP) ..................................... 08001955
Nov. 21, 2008 (EP) ..................................... 08020306

(51) Int. Cl.
*H02P 7/00* (2006.01)
*H02K 7/02* (2006.01)

(52) U.S. Cl. ........................ 318/150; 318/140; 318/161

(58) Field of Classification Search .......... 318/140–142, 318/150, 161, 437, 701; 290/44; 307/9.1, 307/64, 66
See application file for complete search history.

(56) References Cited

U.S. PATENT DOCUMENTS

| | | | | |
|---|---|---|---|---|
| 2,052,965 | A * | 9/1936 | Caputo | 219/108 |
| 4,338,525 | A * | 7/1982 | Kilgore | 290/17 |
| 4,612,494 | A * | 9/1986 | Kawamura | 322/4 |
| 6,204,572 | B1 * | 3/2001 | Liran | 307/64 |
| 6,239,513 | B1 * | 5/2001 | Dean et al. | 307/64 |
| 2006/0138980 | A1 * | 6/2006 | Kimura et al. | 318/140 |
| 2008/0016940 | A1 | 1/2008 | Schmeink | |

FOREIGN PATENT DOCUMENTS

EP    1880837 A2    1/2008

* cited by examiner

*Primary Examiner* — Derek Rosenau

(57) ABSTRACT

A drive apparatus with at least one synchronous motor, a converter and a mechanical energy buffer able to be fed from an energy supply network, which, for converting mechanical energy into electrical current, includes a first asynchronous machine, and a method of operation for such a drive apparatus are specified, with which or in which the energy buffer, especially its first asynchronous machine is directly electrically connected via a switchover device to the at least one synchronous motor, so that the converter included in the drive apparatus is bypassed for such a switch position of the switchover device and the converter accordingly does not have to be designed for currents which flow in such a switch position of the switchover device.

16 Claims, 3 Drawing Sheets

DRIVE APPARATUS AND METHOD FOR ITS OPERATION

CROSS REFERENCE TO RELATED APPLICATIONS

This application claims priority of European application No. 08020306.0 filed Nov. 21, 2008. The application also claims priority of European application No. 08001955.7 filed Feb. 1, 2008. Both of applications are incorporated by reference herein in their entirety.

FIELD OF THE INVENTION

The invention relates to a drive apparatus, especially for a large servo press, as well as to a method for its operation.

BACKGROUND OF THE INVENTION

A plurality of known production and machine tool applications do not always demand a dynamic supply of power while the corresponding application is in operation. Thus it may well occur that during specific phases of production or of the application a largely constant high torque with corresponding largely constant drive speed is demanded, while in other process phases the dynamic power supply mentioned at the outset is demanded for a varying speed. The last-mentioned phases often exhibit a lower demand for torque than those with a constant drive speed. To distinguish between them, such phases are referred to in this document as the "dynamic phase" (DP) or the "quasi-stationary phase" (QSP).

Known drive apparatuses, especially drive apparatuses for servo presses, typically comprise a synchronous motor, by means of which a required mechanical power is provided for a respective production process, with the synchronous motor being driven by an asynchronous machine via a converter. This type of known apparatus can consequently be implemented during all production phases of operation controlled by a converter, and the converter provides the power required during each operating phase in each case.

The disadvantage in such cases is that the converter has to be tuned to the highest power demanded by the drive apparatus and must be in a position to supply this highest power demanded.

SUMMARY OF THE INVENTION

The object of the invention is to specify a less complex and lower-cost drive apparatus.

The object is achieved by a drive apparatus with the features of the claims. To this end there is provision, with a drive apparatus with at least one servo motor, a converter and a mechanical energy store able to be supplied from the energy supply network which includes a first asynchronous machine for converting mechanical energy into electrical current, for the first asynchronous machine to be able to be electrically connected directly via a switchover device to the at least one synchronous motor.

The advantage of the invention lies in the fact that the ability to directly electrically connect the synchronous motor to the first asynchronous machine, i.e. directly to the energy supply network, provides the opportunity of supplying the synchronous motor with high currents, as must be supplied for the quasi-synchronous phase (QSP) entirely without a converter or if need be as a support for the converter. The fact that the synchronous motor is able to be electrically directly connected via the switchover device to the first asynchronous machine thus provides an option for bypassing the converter included anyway by the drive apparatus. This enables the converter to be designed for lower currents, so that overall a more cost-effective embodiment of the drive apparatus is produced. Previously the converter has functioned in each case as the interface between synchronous motor and energy supply network, if necessary between the synchronous motor and an energy buffer downstream from the energy supply network, so that the converter has had to be designed even for the high currents demanded at an almost constant speed in stationary operation, which has led to a corresponding increase in price of the converter and thereby of the drive apparatus.

The direct coupling of the first asynchronous machine to the synchronous motor during the first operating state has proved in trials to be a simple and robust as well as a cost-effective system.

A preferred embodiment of the invention comprises at least one first asynchronous machine for connection of the drive apparatus to an energy supply network, at least one converter, connected on its input side to the first asynchronous machine, a switchover device comprising at least one first and one second input, the first input directly connected to the first asynchronous machine and the second input connected to the converter and at least one synchronous motor connected to the switchover device for feeding mechanical power to a production process, with the switchover device being configured so that during the operation of the drive apparatus the synchronous motor is supplied with energy during a first operating state (QSP) directly from the first asynchronous machine and during a second operating state (DP) from the first asynchronous machine by means of the converter.

The first operating state is in this case preferably an operating state with an essentially constant speed and high power demand, i.e. an operating state corresponding to the quasi-stationary phase (QSP) mentioned above, and the second operating state is preferably an operating state with a variable speed and a lower demand for power compared to the first operating state, i.e. an operating state corresponding to the dynamic phase (DP) mentioned above.

The invention starts from the idea that a variable-speed power supply for the synchronous motor, especially in the first operating state (QSP), with high power demand is not necessary, meaning that the converter does not have to be designed for this high power demand. Instead the invention proposes a coupling of the first asynchronous machine to the or to each synchronous motor which is connected to the respective production process that is able to be switched on and off with the switchover device during the first operating state. During this first operating state with largely constant drive speed and high power demand there can be a direct coupling of the first asynchronous machine to the synchronous motor or, expressed in different terms, a bypassing of the converter. On the other hand, during the second operating state with a varying speed and lower power demand the synchronous motor will be supplied by the first asynchronous machine by means of the converter for example. In accordance with an alternate embodiment the converter can also be connected directly to the energy supply network. Since the demand for power during the second operating state is lower, the converter must consequently only be designed for the low power demand of the second operating state.

The above-mentioned alternate embodiment is characterized by the fact that the drive apparatus comprises two synchronous motors, with the first asynchronous machine being electrically connected directly via the switchover device to one of the two synchronous motors and being connected permanently via the converter electrically to the other synchronous motor. The synchronous motor able to be connected via the switchover device is thus intended for the first operating state, i.e. the quasi-stationary phase (QSP). The synchronous motor connected via the converter on the other hand is intended for a second operating state, i.e. the dynamic phase (DP). This synchronous motor is dimensioned with the converter so that, the dynamic phase can be managed solely by this system. During the entire dynamic phase or at least parts of such a dynamic phase the remaining part, i.e. the synchronous motor able to be activated via the switchover device, is electrically disconnected by the switchover device from the or from each first asynchronous machine. At the beginning of the first operating state (QSP) the synchronous motor connected via the switchover device is electrically connected via the latter to the or to each first asynchronous machine. The mechanical load imposed by the process slows down the two synchronous motors, which leads to an over-synchronous operation of the first asynchronous machine. This means that the first asynchronous machine is operated as a generator and mechanical energy (kinetic energy of the mechanical energy buffer) is converted into electrical energy and supplied to the synchronous motor connected via the switchover device.

The advantage of this embodiment and also of the embodiment described below is that the converter is never disconnected from the respective synchronous motor, which means that no necessity arises for a synchronization of synchronous motor and converter before they are connected together. Furthermore any possible negative effects of oscillating torque arising during connection of the synchronous motor able to be controlled via the switchover device and the first asynchronous machine can be actively damped down by the further speed control of the other synchronous motor.

As an alternative to the embodiment in which the first asynchronous machine is electrically connected via the switchover device directly to one of the two synchronous motors—referred to below as the first synchronous motor in order to make a distinction—and electrically connected permanently via the converter to the other synchronous motor—the second synchronous motor—there is provision for the first asynchronous machine to be connected electrically via the switchover device directly to the first synchronous motor and for the second synchronous motor to be able to be fed via the converter or via the converter and an electrical energy buffer directly from the energy supply network.

The two alternatives differ merely in respect of the relevant feed to the converter. This can either be direct via the energy supply network or indirect via an intermediate energy buffer. This energy buffer can be implemented as an electrical energy buffer, e.g. with capacitors or such like, or as a mechanical energy buffer with kinetic energy accumulator and electric motor.

Preferably there is provision for the drive apparatus to include a control device, with which during the first operating state (QSP) the switchover device is able to be controlled for electrical connection of the synchronous motor or of one of the synchronous motors to the or to each first asynchronous machine.

The control device can in such cases include an identification logic in order to detect a change in the operating state automatically and initiate the switchover process. Alternatively the control device can be controlled by an external identification logic.

For a drive apparatus with a synchronous motor the switchover device for electrical connection of synchronous motor and first asynchronous machine is able to be controlled via the converter by means of the control device during a second operating state (DP). For a drive apparatus with at least a first and a second synchronous motor the switchover device for disconnecting the electrical connection between one of the synchronous motors and the first asynchronous machine is able to be controlled by means of the control device during a second operating state. The switchover as a result of an activation by the control device thus has the effect, with both embodiments of the drive apparatus of the converter being activated and of either the one synchronous motor only being activated via the converter or of only that synchronous motor to which a converter is assigned on its input side being activated. When on the one hand a drive apparatus with one synchronous motor and on the other hand a drive apparatus with two synchronous motors are referred to here, a drive apparatus with "one" synchronous motor also includes a drive apparatus with a group of synchronous motors, with each synchronous motor in this group being activated in exactly the same way as the one synchronous motor. The same then applies to a drive apparatus with two synchronous motors, in which case, instead of each of the "two" synchronous motors, there can also be a group of synchronous motors in each case.

Preferably there is provision for the converter to be designed to perform in the second operating state so that then, by comparison with previously required converters, low-cost converters and overall a more cost-effective drive apparatus are able to be implemented.

A system is preferably provided as a mechanical energy buffer, which, as well as the first asynchronous machine, comprises a flywheel and a second asynchronous machine, with the second asynchronous machine being connected to the energy supply network and connected mechanically to the flywheel and with the flywheel being connected mechanically to the first asynchronous machine. As a result of a supply of energy from the supply network, the second asynchronous machine thus drives the flywheel so that the second asynchronous machine operates as a synchronous motor. The flywheel in its turn and the kinetic energy stored therein drive the first asynchronous machine, so that this is operated as an asynchronous generator. With a favorable mass distribution of the flywheel the system described operates as an energy buffer which, depending on the mass of the flywheel, can also compensate for short-duration power interruptions from the energy supply network.

The above-mentioned object is also achieved with a method for operation of a drive apparatus as described here and below, by the switchover device being controlled as a function of a first or second operating state of the drive apparatus. Preferably provision is made here for the control device to sense the first or second operating state and control the switchover device accordingly, so that the operating state can also be switched over automatically. A control device is provided as a means for implementing the method which receives signals from at least one sensor about the respective operating state, so that the control device is able to detect when a transition between the first and the second operating state is required and an activation of the switchover device can be initiated accordingly. A sensor provided for this purpose is assigned to either the synchronous motor or to one of the synchronous motors or to the production process influenced by the synchronous motor in each case.

A functionality of the control device provided for implementing the method is usually implemented in software or in a combination of software and hardware, so that to this extent the invention also includes a drive apparatus with program code means for implementing a method described here and below.

Advantageous embodiments of the invention are the object of the dependent claims. Retroactive application of references in such cases refer to the further embodiment of the subject matter of the main claim through the features of the respective subclaim; they are not to be understood as dispensing with the objective of an autonomous protection of the subject matter for the feature combinations of the referenced subclaims. Furthermore in respect of an interpretation of the claims for a more detailed specification of a feature in a subordinate claim, it is to be assumed that this type of restriction is not present in the preceding claims in each case.

BRIEF DESCRIPTION OF THE DRAWINGS

An exemplary embodiment of the invention is explained in more detail below based on the drawing. Objects or elements which correspond are provided with the same reference symbols in all figures.

The figures show

DETAILED DESCRIPTION OF THE INVENTION

Figure 1:
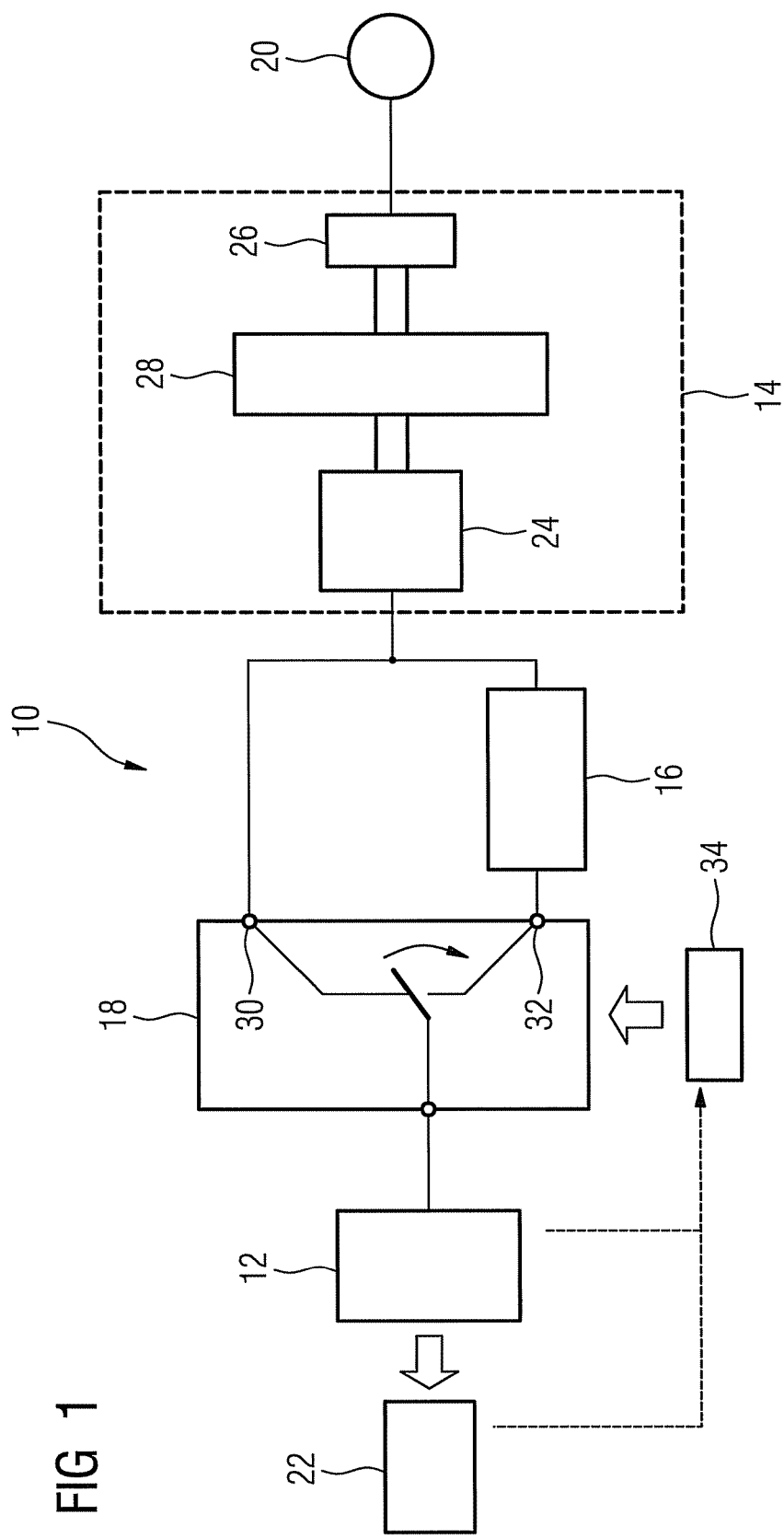
FIG. 1 an inventive drive apparatus with a switchover device.

FIG. 1 shows an embodiment of an inventive drive apparatus 10. The drive apparatus 10 and also the drive apparatuses 10 shown in the subsequent figures comprise a synchronous motor 12, a mechanical energy buffer 14, a converter 16 and a switchover device 18. The overall drive apparatus 10 is connected to an energy supply network 20, and the synchronous motor 12 creates the mechanical power required for an operating process 22, for example a press process, in order to drive a servo press for example. Instead of the one synchronous motor 12 shown, a number of synchronous motors 12 can also be provided.

The mechanical energy buffer 14 includes, and this too again applies both to the drive apparatus 10 depicted in FIG. 1 and also to the drive apparatus 10 depicted in the subsequent figures, a first and a second asynchronous machine 24, 26 and a flywheel 28. The first asynchronous machine 24 is used to supply power to the synchronous motor or motors 12. The second asynchronous machine 26 is connected to the energy supply network 20 and during operation drives the flywheel 28 mechanically connected to this network. Because of a further mechanical connection between flywheel 28 and first asynchronous machine 24, each rotation of the flywheel 28 leads to an actuation of the first asynchronous machine which also acts as a generator and converts the kinetic energy produced by the flywheel 28 into electrical energy. With a suitable mass distribution of the flywheel 28, because of its inertia, a short-term compensation for possible failures of the energy supply network 20 is also possible. In addition it is possible with an energy buffer 14 to keep load peaks away from the energy supply network 20.

With the drive apparatus 10 shown in FIG. 1 the first asynchronous machine 24 is connected to a first input 30 of the switchover device 18, so that the first asynchronous machine 24 is electrically connected via the switchover device 18 directly to the synchronous motor 12. The converter 19 is connected to a second input 32 of the switchover device 18, which is connected in its turn to the first asynchronous machine 24. Depending on the switching state of the switchover device 18, the synchronous motor 12 is connected ether directly (i.e. only via the switchover device 18) or indirectly, namely via the converter 16 (and the switchover device 18), to the first asynchronous machine 24. The direct connection of the synchronous motor 12 to the first asynchronous machine 24 is intended for a first operating state in which during a quasi-stationary phase (QSP) of the production process 22 a constant speed and a high torque of the synchronous motor 12 are required. During the quasi-stationary phase (QSP) high currents are demanded which can be supplied directly by the first asynchronous machine 24 to the synchronous motor 12. In this first operating state the converter 16 is preferably not involved in the provision of power for the synchronous motor 12. Alternatively the converter 16 can provide auxiliary power in this first operating state.

During a second operating state, referred to as the dynamic phase (DP) to distinguish it from the first phase, the synchronous motor 12 is to be operated at different speeds at comparatively low torque (=reduced current). For this operating state the switchover device 18 is switched off, so that the synchronous motor 12 is connected directly, namely via the converter 16, to the first asynchronous machine 24. The converter 16 can be used for speed control and a regulated power supply is provided for the synchronous motor 12. A rapid and precise regulation of the power needed is required in this second operating state since the speed can fluctuate greatly here and the converter 16 must accordingly react rapidly. In this second operating state a power-rated supply of the synchronous motor 12 directly by the first asynchronous machine 24 is not advisable or even possible, since the first asynchronous machine 24 and its corresponding upstream system would be too slow for energy buffering.

The advantage of the drive apparatus 10 shown in FIG. 1 and in the subsequent figures lies in the fact that the converter 16 at the low currents during the dynamic phase does not need to be designed so that even the currents which flow during the quasi-stationary phase do not damage the converter 16. The switchover device 18 thus acts on demand as a bypass device for the converter 16. With other circuits (FIG. 2, FIG. 3) the connection to the converter 16 is optional.

For activation of the switchover device 18 a control device 34 is provided which senses the first or second operating state, e.g. with reference to measured values received at the synchronous motor 12 or in the production process 22.

Figure 2:
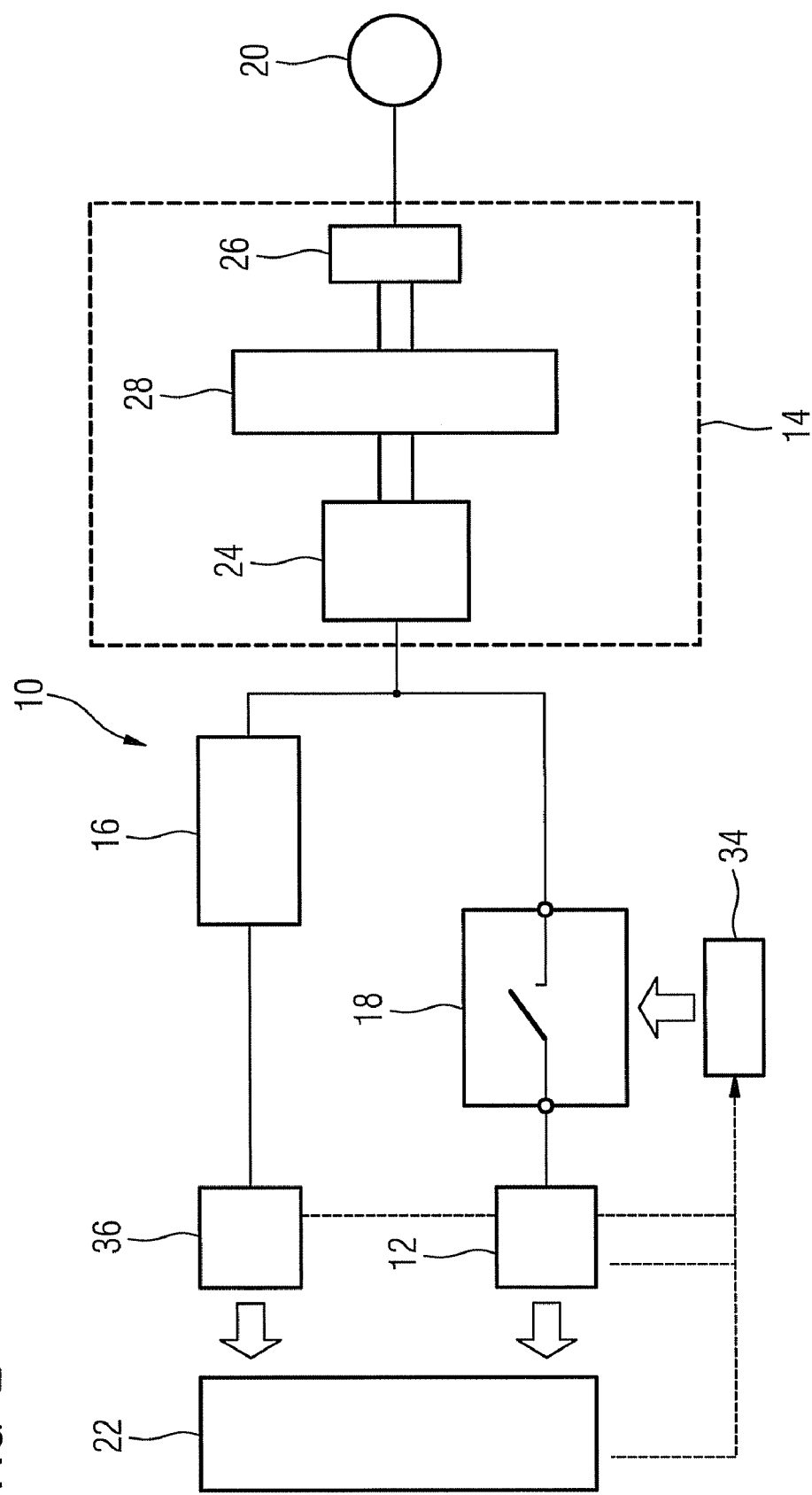
FIGS. 2, 3 alternate embodiments of the inventive drive apparatus.

FIG. 2 shows an alternate embodiment of the drive apparatus shown in FIG. 1. Unlike the drive apparatus 10 shown in FIG. 1, this drive apparatus has two synchronous motors which will be referred to below as the first synchronous motor 12 and the second synchronous motor 36 in order to distinguish between them. The first synchronous motor 12 is connected exactly like synchronous motor 12 depicted in FIG. 1 via switchover device 18 to the first asynchronous machine 24. In this embodiment too the first asynchronous machine 24 is electrically directly connected via the switchover device 18 to one of the synchronous motors, namely the first synchronous motor 12. In addition the first asynchronous machine 24 is connected permanently via the converter 16 to the other synchronous motor, i.e. the second synchronous motor 36. During the first operating state (QSP) the control device 34 brings about an activation of the switchover device 18 for electrical connection of the first synchronous motor 12 to the first asynchronous machine 24. In the second operating state (DP) the control device 34 brings about a disconnection of the electrical connection of the first synchronous motor 12 and the first asynchronous machine 24. In the first operating state, i.e. during the quasi-stationary phase, the two synchronous motors 12, 36 are active for influencing the operating process 22, i.e. for driving a press for example. The second synchronous motor 36 is dimensioned in this case so as to enable it to manage the drive of the second operating process 22 on its own during a second operating state, i.e. a dynamic phase (DP). The converter 16 is thus designed for a corresponding power demand of the second synchronous motor 36. This means that even during the quasi-stationary phase (QSP) no more current flows via the converter 16 than is "called down" by second synchronous motor 36 and the high current for maintaining torque required during the quasi-stationary phase is essentially called down by the first synchronous motor 12 and fed to the latter via the switchover device 18. For the activation of the switchover device 18 the control device 34 senses transitions between the first and the second operating state.

Figure 3:
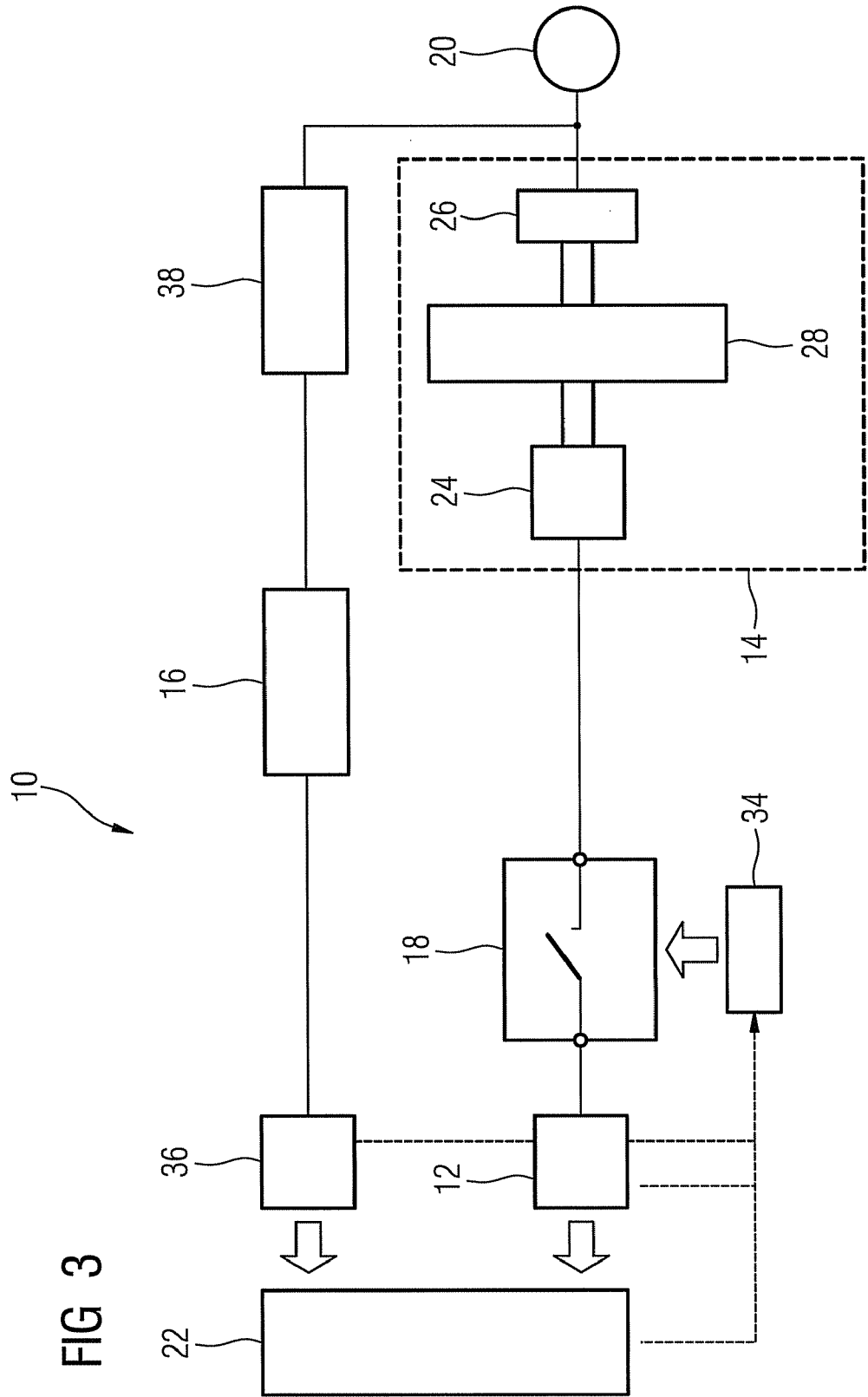

FIG. 3 shows an embodiment of the drive apparatus, which essentially corresponds to the drive apparatus 10 shown in FIG. 2. The difference between the two is that the converter 16 is not supplied by the first asynchronous machine 24, i.e. at least directly from the mechanical energy buffer 14, but from an electrical energy buffer 38 connected to the energy supply network 20, i.e. via a large capacitor or a capacitor network for example, For control of the synchronous motor 12 (FIG. 1) or of the first synchronous motor 12 (FIGS. 2, 3) it should also be pointed out that a speed control tailored to this process state can be derived from a characteristic slip curve of the first asynchronous machine 24. With regard to slip a P control is produced here, the gain of which is defined by the rise of the characteristic slip curve of the first asynchronous machine 24. At the time of connection the electrical rotary frequency of the first asynchronous machine 24 is higher than that of the respective synchronous motor 12. In this state the first asynchronous machine 24 acts as a generator and supplies the respective synchronous motor 12 with electrical energy which then supplies said energy in the form of mechanical energy to the process 22. The speed break occurring a result of the conversion from kinetic into electrical energy in the mechanical energy buffer 14 with the two asynchronous machines 24, 26 can be kept within an intended tolerance window by a corresponding design of the inertia present in this system (of the flywheel 28).

The said inertia can be optimized by the flywheel 28 linked to the first asynchronous machine 24 as well as the second asynchronous machine 26 linked mechanically to the flywheel 28. The combination of second and first asynchronous machine 26, 24 together with the flywheel 28 thus functions as a mechanical energy accumulator or energy buffer. This allows process-related current peaks to be kept away from the network since the inert masses act as compensators.

The switchover of the synchronous motor 12 adapted to the power requirements of the respective operating state either directly to the first asynchronous machine 24 or indirectly to this machine via the converter 16 means that it is no longer necessary to "overdimension" the converter to a certain extent but the converter 16 must only be adapted to the lower power demand of the second operating state. This allows the procurement and design costs for the drive apparatus to be significantly reduced.

In the second operating state, during which the converter 16 takes over the power-rated power supply of the synchronous motor 12, there is now a smaller power or current demand. For example the application of the invention in conjunction with a servo press as operating process 22 can lead to a torque and current demand during the second operating state which, by comparison with the corresponding demand in the first operating state amount to less than a third. The converter 16 can thus be dimensioned correspondingly smaller as regards its current-carrying capacity.

In an inventive drive apparatus 10 the converter 16 can thus be dimensioned smaller by comparison with apparatuses from the prior art, which leads to lower investment and operating costs. During operation in the first operating state with high performance demands with a largely constant speed, a system comprising a first asynchronous machine 24, flywheel 28 and second asynchronous machine 26 ensures that power peaks are kept away from the energy supply network 20 and a high power is made available for the synchronous motor 12 at a largely constant speed, so that the drive apparatus 10 operates robustly overall. In the second operating state with variable speed and low power everything is "as you were" and the converter 16 supplies the synchronous motor 12 with variable power.

The present invention can thus be briefly summarized as follows: A drive apparatus 10 with at least one synchronous motor 12, a converter 16 and a mechanical energy buffer 14 able to be fed from an energy supply network 20, which for conversion of mechanical energy into electrical current comprises a first asynchronous machine 24, and a method of operation for such a drive apparatus 10 are specified, with which or in which the energy buffer, especially its first asynchronous machine, is directly electrically connected via a switchover device 18 to the at least one synchronous motor 12, so that the converter 16 included in the drive apparatus 10 is bypassed for such a switch setting of the switchover device 18 and the converter 16 accordingly does not have to be designed for currents which flow in such a switch position of the switchover device 18.

The invention claimed is:

1. A drive apparatus for converting a mechanical energy into an electrical current, comprising:
    an energy supply network;
    a mechanical energy buffer connected to the energy supply network;
    a converter connected to the mechanical energy buffer;
    a switchover device comprising a first input directly connected to the mechanical energy buffer and a second input connected to the converter;
    a first synchronous motor connected to the switchover device; and
    a first asynchronous machine that is electrically directly connected to the first synchronous motor via the switchover device,
    wherein the first synchronous motor is electrically directly connected to the first asynchronous machine via the switchover device, and
    wherein a second synchronous motor is fed directly from the energy supply network via the converter.

2. The drive apparatus as claimed in claim 1,
    wherein the first synchronous motor is electrically directly connected to the first asynchronous machine via the switchover device, and
    wherein the second synchronous motor is electrically connected to the first synchronous motor via the converter.

3. The drive apparatus as claimed in claim 1,
    wherein the first synchronous motor is electrically directly connected to the first asynchronous machine via the switchover device, and
    wherein the second synchronous motor is fed directly from the energy supply network via the converter and an electrical energy buffer.

4. The drive apparatus as claimed in claim 1, further comprising a control device.

5. The drive apparatus as claimed in claim 4, wherein the control device controls the switchover device to electrically directly connect the first synchronous motor to the first asynchronous machine during a first operating state.

6. The drive apparatus as claimed in claim 5, wherein the control device controls the switchover device to electrically connect the first synchronous motor to the first asynchronous machine via the converter during a second operating state.

7. The drive apparatus as claimed in claim 6, wherein the switchover device disconnects the direct electrical connection between the first synchronous motor and the first asynchronous machine during the second operating state.

8. The drive apparatus as claimed in claim 6,
wherein the first operating state comprises an operating state with an essentially constant speed and a high power demand, and
wherein the second operating state comprises an operating state with a variable speed and a lower power demand than the first operating state.

9. The drive apparatus as claimed in claim 8, wherein the converter is power rated for the second operating state.

10. The drive apparatus as claimed in claim 1, wherein the mechanical energy buffer comprises:
a flywheel that is mechanically connected to the first asynchronous machine, and
a second asynchronous machine that is connected to the energy supply network.

11. A method for operating a drive apparatus, comprising:
providing an energy supply network;
connecting the energy supply network to a mechanical energy buffer;
connecting the mechanical energy buffer to a converter;
providing a switchover device comprising a first input directly connected to the mechanical energy buffer and a second input connected to the converter;
connecting the switchover device to a first synchronous motor; and
controlling the switchover device for electrically directly connecting the first synchronous motor to a first asynchronous machine,
wherein the first synchronous motor is electrically directly connected to the first asynchronous machine via the switchover device, and
wherein a second synchronous motor is fed directly from the energy supply network via the converter.

12. The method as claimed in claim 11, wherein the switchover device is controlled by a control device.

13. The method as claimed in claim 12, wherein the control device controls the switchover device to electrically directly connect the first synchronous motor to the first asynchronous machine during a first operating state.

14. The method as claimed in claim 13, wherein the control device controls the switchover device to electrically connect the first synchronous motor to the first asynchronous machine via the converter during a second operating state.

15. The method as claimed in claim 14, wherein the control device determines whether an operating state is the first operating state or the second operating state and controls the switchover device accordingly.

16. The method as claimed in claim 15, wherein the control device comprises a program code for implementing the method.

* * * * *